United States Patent [19]

Bolger

[11] Patent Number: 4,472,733
[45] Date of Patent: Sep. 18, 1984

[54] COLOR CHANNEL SIGNAL-TO-NOISE IMPROVEMENT IN DIGITAL TELEVISION

[75] Inventor: Thomas V. Bolger, Camden, N.J.
[73] Assignee: RCA Corporation, New York, N.Y.
[21] Appl. No.: 413,707
[22] Filed: Sep. 1, 1982
[51] Int. Cl.³ .......................................... H04N 9/535
[52] U.S. Cl. ..................................... 358/38; 358/904
[58] Field of Search .................. 364/724; 358/36–38, 358/31, 167, 905, 166, 40, 904

[56] References Cited

U.S. PATENT DOCUMENTS

| | | | |
|---|---|---|---|
| 3,742,395 | 6/1973 | Yoneyama | 358/904 |
| 4,038,539 | 7/1977 | Van Cleave | 364/724 |
| 4,064,530 | 12/1977 | Kaiser et al. | 358/36 |
| 4,106,102 | 8/1978 | Desblache | 364/724 |
| 4,146,931 | 3/1979 | Delforge | 364/724 |
| 4,268,855 | 5/1981 | Takahashi | 358/36 |
| 4,283,693 | 8/1981 | Sanez | 333/18 |
| 4,296,436 | 10/1981 | Achiha | 358/167 |
| 4,303,943 | 12/1981 | May | 358/167 |
| 4,321,686 | 3/1982 | Horna | 364/724 |
| 4,322,739 | 3/1982 | Drewery et al. | 358/13 |
| 4,334,244 | 6/1982 | Chan et al. | 358/166 |
| 4,395,729 | 7/1983 | Lewis | 358/36 |
| 4,402,013 | 8/1983 | Wargo | 358/160 |

Primary Examiner—John C. Martin
Assistant Examiner—E. A. McDowell
Attorney, Agent, or Firm—E. M. Whitacre; P. J. Rasmussen; E. P. Herrmann

[57] ABSTRACT

Circuitry included in a TV receiver for enhancing the signal-to-noise ratio of the chrominance signal includes an adaptive linear phase, low pass filter which has its bandwidth controlled responsive to the upper frequency components of the current chrominance signal. A frequency analyzer coupled to the chrominance channel counts the number of chrominance signal excursions during predetermined periods to generate a number related to the maximum signal frequency during such periods. The number is applied to a decoder which generates address codes for application to a look up table which provides filter coefficients for altering the filter bandwidth in accordance with the current maximum signal frequency components.

11 Claims, 7 Drawing Figures

COLOR CHANNEL SIGNAL-TO-NOISE IMPROVEMENT IN DIGITAL TELEVISION

BACKGROUND OF THE INVENTION

The present invention relates to color signal processing in a TV receiver and more particularly to adaptively filtering the color signals in accordance with the bandwidth of the current color signal averaged over a short interval. In so doing the filter bandwidth is continuously adjusted resulting in an average bandwidth significantly less than the value required of a fixed filter to pass the higher frequency color signal components thereby enhancing the signal-to-noise ratio of the color signal.

In standard analog TV receiver design color signals are filtered to eliminate out-of-band noise. The bandwidth of such filters is generally a compromise design with the view of achieving good transient response while at the same time suppressing noise to the fullest extent commensurate therewith. If the filter bandwidth were instantaneously varied in accordance with the spectral content of the current signal both functions could be realized without the compromise. In the receiver the color signals are ultimately combined with the luminance signal to generate R, G and B signals to drive the kinescope. It is therefore imperative that the color signal filter introduce substantially no differential phase delay between the color and luminance signals. It is not presently practical to design an adaptive analog filter which does not introduce differential phase delay between the color and luminance signals that ultimately produces smeared or blurred images when reproduced on the TV screen.

It is however presently practical to process video signals with digital techiques. Further, if finite impulse response or FIR filters are utilized to perform the filter functions, they may be programmed for adaptively adjusting bandwidths and amplitude response without introducing differential phase delay.

SUMMARY OF THE INVENTION

The present invention is a TV receiver incorporating digital circuitry for processing video signal. An adaptive low pass digital FIR filter is included in the color channel (for example the I and Q signal paths) to substantially eliminate electrical noise energy outside of the band of color signal frequencies. The bandwidth of the adaptive filter is automatically adjusted to respond to the frequency content of the color signal currently being processed.

A delay element is included ahead of the adaptive FIR filter, providing a period over which the average frequency content of the signal may be analyzed.

The frequency content of the color signal is analyzed by an adaptive bandpass filter which centers itself about a minimum threshold energy level of the highest signal frequencies currently present in the color channel. The signals generated by the analyzer are applied to adjust the adaptive lowpass FIR filter to the minimum bandwidth required to pass the color signal. In one embodiment it is possible to realize the lowpass filter as part of the bandpass filter utilized in the frequency analyzer.

DETAILED DESCRIPTION OF THE INVENTION

Figure 1:
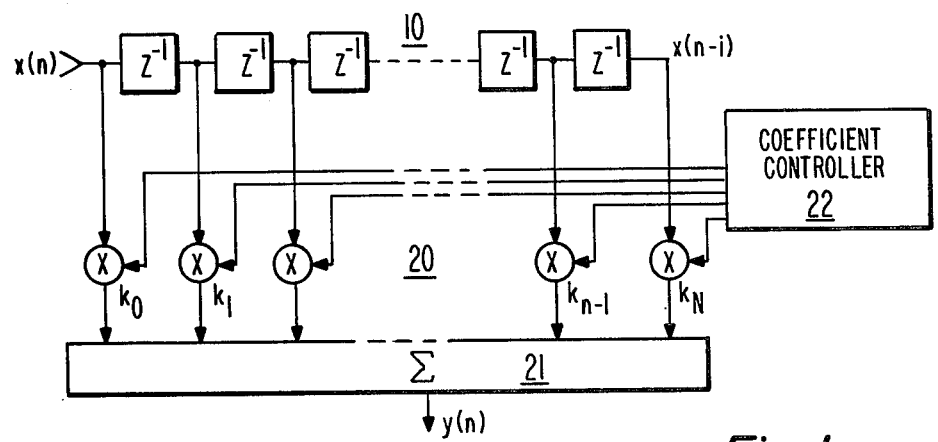
FIG. 1 is a block diagram of an adaptive FIR filter.

Referring to FIG. 1, there is shown an output weighted sampled data FIR filter generally known to those skilled in the art of digital signal processing. Elements 10 are serially cascaded delay stages each of which delays the applied signal X(n) for one sample period. The applied signal X(n) and the output signals from the elements 10 are respectively applied to coefficient multipliers 20, each of which generates an output signal $X(n-r)K_r$, where r denotes the number of delays imposed on the applied signal X(n) and $K_r$ is the value of the respective coefficient. The output signals from the coefficient multipliers 20 are summed in ADDER 21 to generate the filter output signal Y(n). A controller 22 determines the value of each of the coefficients and can be arranged to change the coefficients at desired intervals. Controller 22 may simply be a memory device which is periodically cycled through various address codes to apply known coefficients to the multipliers in a predetermined sequence.

The transfer function of the FIG. 1 type filter for a given set of coefficients $k_r$ is given by the equation:

$$Y(n) = \sum_{i=0}^{M} k_i X(n - i). \tag{1}$$

For a different set of coefficients $A_r$ the transfer function is $$Y(n) = \sum_{i=0}^{M} A_i X(n - i). \tag{2}$$

Thus, if the coefficients can be changed within a sample period, the filter can perform a different filter function for each applied signal sample X(n).

A particular feature of the FIG. 1 type filter is that as long as the weighting coefficients are maintained symmetrical about the center point of the delay stages 10, the group delay of the processed signal remains constant i.e. the filter is a linear phase device. Therefore, subject to the foregoing condition, the filter function can be changed without altering the group delay.

It will be recognized that an adaptive FIR filter with constant group delay can also be realized with an input weighted structure (not shown). However, the input weighted filter has the limitation that the filter function cannot be changed on a sample by sample basis, but rather must be changed over a period of N samples since the partial sums generated in an input weighted structure must be cleared from the filter register before the new or changed function becomes effective.

Figure 2:
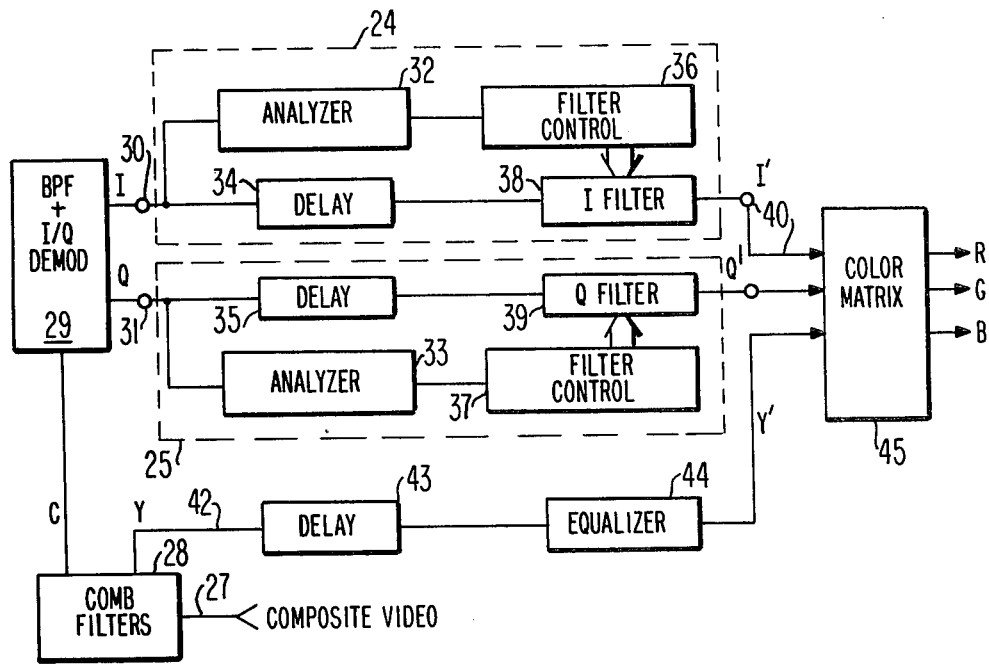
FIG. 2 is a block diagram of a portion of the color signal processing channel including adaptive low pass FIR filters.

FIG. 2 illustrates a portion of the video signal processing circuitry of a color TV receiver incorporating adaptive lowpass filtering in the color signal channels. In the receiver, adaptive lowpass filters 38 and 39 are adjusted to have the minimum bandwidth in accordance with the level of activity of the signal present in the I and Q channels for the purpose of enhancing the signal-to-noise ratio of these signals. In the figure, composite video signal is applied to the input terminal 27 of comb filter circuitry 28 wherein the chrominance C and luminance Y components of the video signal are separated. In an NTSC type system the luminance signal Y is composed of the sum of specific percentages of the red, R, blue, B, and green, G color signals of the transmitted scene, and is a wideband signal. The luminance represents the brightness of the picture. The chrominance signal is a carrier modulated by two signals I and Q having a quadrature relationship. Both of these signals are also composed of R, B and G components, for example $$I = 0.60R - 0.28G - 0.32B \quad (2)$$

$$Q = 0.21R - 0.52G + 0.31B. \quad (3)$$

The bandwidth of the I signal is 1.5 MHz and the bandwidth of the Q signal is 0.5 MHz.

The chrominance signal is applied to circuitry 29 where it is bandpass filtered (to reduce out of band signal and noise) and demodulated to its I and Q components. The I signal available at terminal 30 and the Q signal available at terminal 31 are respectively applied to adaptive lowpass filter 24 and 25. The filtered signals I' and Q' produced at terminals 40 and 41 are applied to a color matrixing circuit 45 wherein they are generally converted to R−Y, and B−Y signals which are then combined in proper proportions with the luminance signal to generate R, G and B signals for driving a kinescope.

The adaptive filter 24(25) includes an adjustable bandwidth FIR filter 38(37) (e.g. of the type illustrated in FIG. 1) and circuitry 32 and 36 (33 and 37) for determining the highest signal frequencies of the I(Q) signal currently available at terminal 30(31). A delay element 34(35) is serially connected between the output of circuitry 29 and the adjustable bandwidth FIR filter 38(39). The delay element provides a period over which the average value of the maximum signal frequencies and thereby the filter coefficients may be generated before application of the delayed signal to the filter, or in an application where the FIR filter is to be selectively changed on a sample by sample basis, to provide sufficient time to examine the sample and reprogram the filter. Conceptually, it is desirable to alter or reprogram the filter coefficients during periods when there is no signal present, for example during horizontal blanking periods. Operation in this mode lessens device speed requirements of the reprogramming circuitry. Thus, if the filter coefficients are to be changed on a line by line basis, the delay elements 34(35) will nominally be 1H delay lines though in fact they may be more or less than 1H. Consider delay element 34 to be exactly 1H long. In this situation the spectrum of an entire line can be examined before that line is applied to the filter 38. On the other hand, if the delay element is less than 1H long, only the leading portion (equal to the delay length) of each particular line would be analysed with respect to that line though the spectral content of a portion of the preceding line can be averaged in the determination of the filter coefficients.

Referring again to FIG. 2, a signal analyzer 32 (33) connected to terminal 30(31) examines the I(Q) signal for its frequency content over a predetermined period, e.g. 1 line. The analyser 32(33) generates a control signal related to the maximum signal frequency present during the period. The control signal is applied to the filter controller 36(37), which may be a read only memory programmed with sets of coefficient values to reprogram the filter coefficients and thereby the filter bandwidth in accordance with the current maximum signal frequency.

Figure 3:
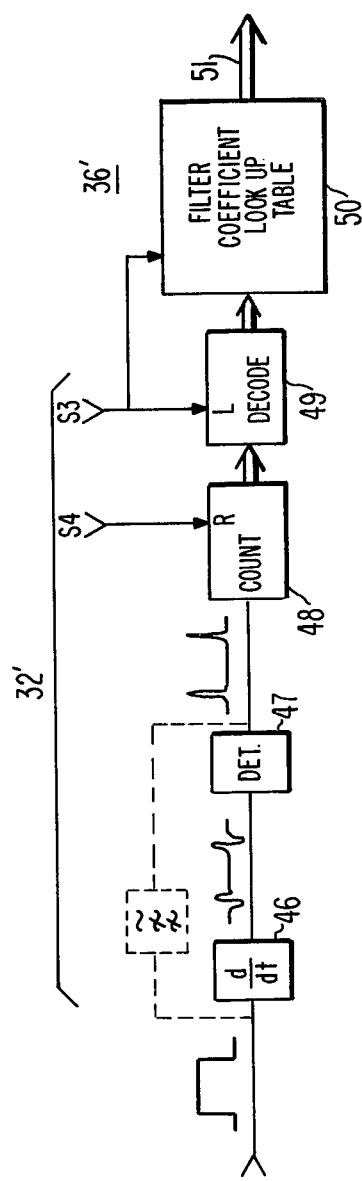
FIGS. 3, 6 and 7 are block diagrams of circuitry for dynamically controlling a FIG. 2 type adaptive filter.

FIG. 3 is a block diagram of one particular approach for analyzing signal frequency content and controlling the adjustable filter. The elements designated 32' form a type of frequency analyser and the element 36' corresponds to the filter controller 36 in FIG. 2. Note the waveforms included in the FIG. 3 drawing are generally analog signals implying that the circuit elements are of the analog type. It will be recognized by those skilled in the art of digital signal processing that there are readily available equivalent digital processing elements so that the FIG. 3 circuitry and the function it performs as well as the invention in general may be practiced on analog or digital signals.

In the analyzer, the signal is first differentiated (46) to eliminate low frequency signal components and then amplitude threshold detected (47). The detector may be a comparator which compares the amplitude of the differentiated signal against a fixed reference level, which level is set at a value greater than the anticipated amplitude of the noise in the channel. The output of the comparator is a bilevel potential which changes state each time the input signal crosses the reference level. The comparator or detector output signal is applied to a counter 48 which counts the number of positive going (or negative going) transitions of the bilevel signal. The number N in the counter is generally proportional to the average signal frequency $F_a$ over the period, T, in which the transitions were counted i.e. $F_a = N/T$. For an NTSC system, the maximum count in the I channel corresponding to 1.5 MHz signal is approximately 100 or 7 bits in a binary representation.

The count N is applied to circuit 49 where it is decoded—for example, divided into ranges. For practical reasons it is generally not possible to have a set of coefficients for each count value. The circuitry 49 may therefor be implemented to divide the binary value into, e.g., 16 ranges represented by 4 bit binary numbers. The circuit 49 may arrange this 4 bit number as the most significant bits of an address code to which 4 least significant are added to form an 8 bit address. This address is applied to the circuitry 51, which may be a coefficient look up table comprised of a read only memory or ROM. The decoder will cycle through the possible combinations of the least significant bits during each horizontal blanking interval to generate 16 separate addresses for the current range number, one address for each coefficient. For this configuration, each range number will produce 16 coefficients from the look up table and is applicable to a programmable filter having a maximum of 16 coefficient multipliers. Note if five least significant bits are added to the range number, a total of 32 coefficients can be produced for each range number etc.

Figure 4:
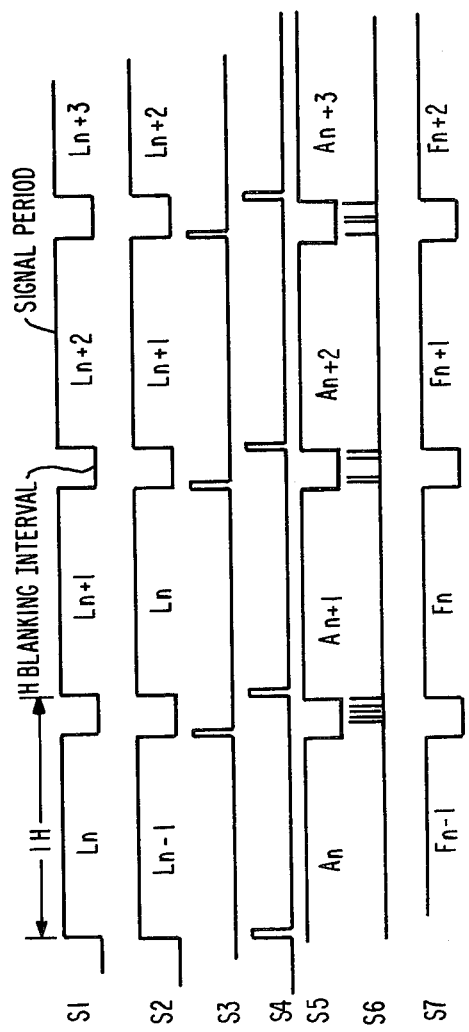
FIG. 4 is a system timing diagram for the FIG. 2–3 circuitry.

The general timing of the FIGS. 2 and 3 circuits is illustrated in part in FIG. 4. In FIG. 4, the signal S1 represents the signal available at terminal 30. This signal is segmented in sequential horizontal line segments each 1H long including respective blanking intervals and signal intervals (not drawn to scale). Signal S2 is the output of the 1H delay element (34, 35). Each S2 signal interval is displaced in time from the S1 signal intervals by precisely one line interval, which signal is applied to the programmable or adaptive filter (38, 29). At the beginning of each S1 signal segment Li a pulse S4 is generated to start the counter. At the end of each S1 signal interval, a further pulse S3 is generated to latch the count S6 into the decoder. Note the leading and trailing edges of the blanking interval may be used to determine the generation of pulses S3 and S4. Note also that it may be possible in certain circuit configurations to simultaneously start or reset the counter and latch the current number N in the decoder with a single signal S3. The window during which the spectral information of the signal in interval Li is determined by the analyser, is the period Ai designated by S5. The filter functions Fi corresponding to the counts N determined during windows Ai are shown as S7 and are temporally aligned with the respective signal interval Li applied to the filter.

Figure 5:
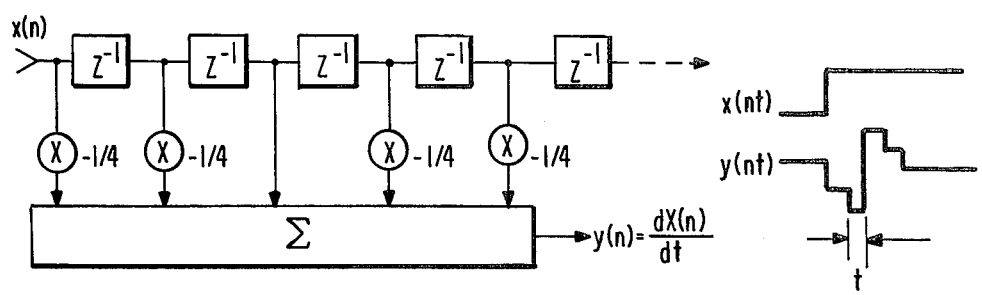
FIG. 5 is a block diagram of a sampled data filter having a transfer function which emulates a differentiating device.

The differentiator 46 effectively performs a high pass filter function and can be replaced by such an element (shown in phantom lines in FIG. 3). The Detector function may be incorporated in the counter input circuit provided the signal amplitude is large enough to trigger the counter. A linear phase high pass filter which may be implemented in place of the differentiator is shown in FIG. 5. If the differentiator function is realized by a high pass filter, and if the delay element 34 is realized by a plurality of serially cascaded one sample delay stages the filter of FIG. 5 can be incorporated as part of the first four stages of the delay element.

Referring again to FIG. 2, a delay 43 and an equalizer 44 are serially interposed in the luminance channel between the comb filter 28 and the color matrix circuitry 45. It will be remembered that the I, Q and Y signals for each horizontal line contain the necessary signal components to reconstruct the R, G and B signals in the matrix 45. The luminance signal Y must therefore be in precise temporal coincidence with the I and Q signals at the matrix circuitry. Delay element 43 in the luminance channel compensates for the I and Q delays imposed by elements 34 and 35. The equalizer 44 compensates for the group delay imposed on the I and Q signals by filters 38 and 39.

In a linear phase FIR filter such as the I and Q filters 38 and 39, the group delay is constant and equal to the time required for a signal sample applied to the filter input to be translated to the midpoint of the filter. For a FIR filter having R delay stages, the group delay is R/2 times the delay of each stage. To match this delay, the equalizer 44 in the luminance channel can be realized with an R/2 stage shift register and may be incorporated in the delay element 43.

Figure 6:
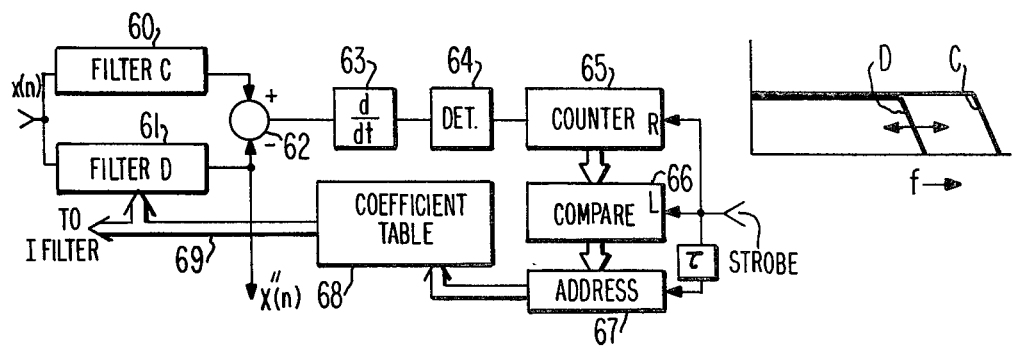

FIG. 6 is a variant of the FIG. 2 circuitry wherein the spectral information of the signal is more accurately determined by examining a narrow band of the signal frequencies. The input signal is filtered by a sliding bandpass filter which passes signal at the upper end of the signal spectrum. If the signal energy in the passband is below a predetermined value the passband is shifted to a lower frequency region and the signal energy in the new passband is examined. The passband of the bandpass function is iteratively adjusted until the system finds the frequency range having a particular signal energy level indicative of the appropriate cut off frequency for the low pass I or Q filter. The system adjusts the spectral portion of the passband by selectively reprogramming adaptive filters. When the appropriate spectral region is found the programming information for the bandpass function corresponds to the programming information for the low pass filter function either by way of similarity of filter coefficients or by way of address information to be applied to a coefficient look up table.

In FIG. 6 differentiator 73, detector 74 and counter 75 operate in similar fashion to the FIG. 3 elements 46, 47 and 48. Delay element 80 provides the time over which the input signal X(n) spectral information may be analysed and filter 81 is the programmable low pass filter (in the I channel for example).

The sliding bandpass filter function is realized by subtracting, 72, the filter response of a narrower band low pass filter 71 from the filter response of a parallel broader band low pass filter 70. The passband is the spectral region between the cut off frequencies F1 and F2 shown in the insert. Low pass filters 70 and 71 are both programmable with respect to bandwidth and it will readily be appreciated that if they are simultaneously reprogrammed their cut off frequencies can be readjusted to track one another to produce a sliding passband. It is noted, however, that it may not be practical to maintain the width of the passband precisely constant if simple adaptive FIR filters are employed due to the precision which may be required of the coefficients. But since the system is designed only to estimate the maximum frequency range of the current input signal, it is unnecessary to maintain a precise bandwidth of the sliding bandpass function.

The signal transitions within the bandpass at the output of subtractor 72 are conditioned and counted in circuits 73, 74 and 75. The count N is compared against a reference in comparator circuitry 76. Depending upon how much greater or lesser the count N is than the reference, the comparator will output increment, hold or decrement signals to address circuitry 77. Responsive to the comparator 76 signals, the addressing circuitry 77 controls the particular sets of coefficients produced by the coefficient table (ROM) to adjust the position of the passband. In this embodiment, it is convenient to arrange the sets of filter coefficients in the table corresponding to ascending/descending filter cut off frequencies to be at ascending/descending address location. In order to slide the passband up or down it is only necessary to increment/decrement the coefficient address applied to the table. Iteration of the passband position is controlled by a strobe signal or signals applied to the counter 75, comparator 76 and addressing circuits 77, which signal may be generated from the horizontal blanking pulses. In certain applications, however, it may be desirable to perform the iterations at a rate higher or lower than the horizontal line rate.

The coefficient table may be one, two or three parallel tables since different sets of programming coefficients may be required for the different filters 70, 71 and 81. Note, however, that the bandwidth of the broader band filter 70 may in fact coincide with the bandwidth of the I filter 81, and if the two filters are of similar design, they may share the same coefficients. On the other hand it may not be desirable to reprogram the filter 81 each time the analyzer filters are reprogrammed, therefor a latch 82 is included in the coefficient data path between filter 81 and the coefficient table. The latch may be energized by a programming pulse P which may be the transition of the horizontal blanking pulse.

Where the programmability of filter 70 is designed to be sufficiently fast that a coefficient change does not generate undesirable discontinuities in the processed signal, the desired filter function Y″(n) may be realized directly from the output of filter 70 without the need for delay element 80 and I filter 81.

Figure 7:
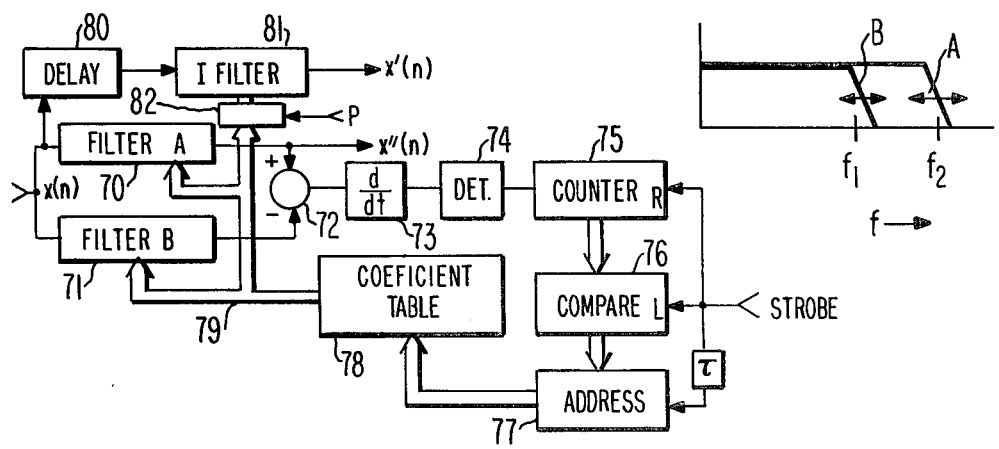

FIG. 7 is a further variation of the FIG. 6 circuit. In FIG. 7, the signal spectral content is examined in a passband which has a fixed upper cutoff frequency and a variable lower cutoff frequency. The cutoff or 3 db frequency of the fixed filter must be at least as large as the maximum frequency component of the applied signal which for the I component of the chrominance signal is 1.5 MHz. The passband is realized by subtracting the signal response of a programmable low pass FIR filter 71 from the response of a constant bandwidth low pass filter 60. In other respects, operation of the FIG. 7 circuit is similar to the operation of the FIG. 6 circuit. The circuit of FIG. 7 may be implemented to program a further low pass filter e.g. the I or Q filters, or for certain applications the low pass filter response may be derived directly from the output of the FIR filter 61.

The sliding bandpass filter of FIG. 6 and the variable bandpass filter of FIG. 7 in the foregoing embodiments have been realized by subtracting the response of one low pass filter from the response of another parallel connected low pass filter. These functions may also be produced by cascading a low pass filter with a high pass filter which have overlapping frequency responses.

Implicit in the foregoing discussion is the requirement that the coefficients remain symmetrical about the filter midpoint to retain the linear phase filter characteristic. It is a straight forward exercise for those skilled in the art of FIR filter design to select sets of symmetrical weighting coefficients for changing the lowpass filter cutoff frequency. To illustrate by simple example consider the filter of FIG. 1 to have four delay stages and five weighting circuits $k_o$–$k_4$ and consider the register to be clocked at 3.58 MHz. Selecting the $k_o$–$K_4$ coefficients equal to $-0.5, 1, 3, 1, -0.5$ respectively results in a lowpass transfer function having a relative amplitude response of four and a cutoff frequency of 1.2 MHz. With $k_o$–$k_4$ coefficients equal to 0, 1, 2, 1, 0 respectively, the relative amplitude response is again 4 but the cutoff frequency is 0.6 MHz.

As the bandwidth is changed by smaller increments/decrements the number of significant decimal places (resolution) in the coefficients becomes larger. The complexity of the weighting circuits will tend to increase concomitant with the higher resolution of the coefficients. It may therefore become impractical to select coefficients which will maintain the relative amplitude response of the filter constant while changing the bandwidth. To compensate for amplitude response changes a programmable signal scaling circuit (weighting circuit) may be serially included in the input or output signal path of the filter. The scaling circuit will be programmed via programming coefficients from a lookup table which is addressed simultaneously with the filter coefficient lookup table. The scaling circuit lookup table may contain a corresponding programming coefficient for each set of filter coefficients.

The invention has been described in terms of adaptively filtering the I and Q components of a TV signal but it will readily be appreciated by those skilled in the art of TV signal processing that the adaptive filtering may be performed directly on the chrominance signal before demodulation to the I and Q components.

What is claimed is:

1. In a television receiver for processing composite video signals including phase related luminance and chrominance components, circuitry for low pass filtering the chrominance component comprising:
    first and second sources of separated luminance and chrominance signals respectively;
    a linear phase low pass FIR filter having constant group delay and a cutoff frequency which is alterable by application of particular sets of coefficients thereto said FIR filter having an input terminal coupled for receiving chrominance signal from said second source and having an output terminal coupled to R, G and B matrixing circuitry;
    frequency analyzing means responsive to signal from said second source for generating a further signal representative of the frequency content of the chrominance signal;
    coefficient producing means responsive to said further signal for applying sets of coefficients to said FIR filter for adjusting the cutoff frequency of said FIR filter to the frequency content of the current chrominance signal; and
    means for coupling the luminance signal from said first source to said matrixing circuitry, said means restoring the luminance and chrominance signal phase relationship by compensating the luminance signal for the group delay imposed on the chrominance signal by the FIR filter.

2. The television receiver set forth in claim 1 including a first signal delay means connected between the second source and the input terminal to the FIR filter and wherein the means coupling the luminance signal to said matrixing circuitry includes a second like signal delay means.

3. The television receiver set forth in claim 1 wherein the coefficient producing means is a memory element having sets of coefficients stored at particular address locations.

4. The television receiver set forth in claim 3 wherein the frequency analysing means comprises:
    a high pass filter having an input terminal coupled to said second source and having an output terminal;
    a counting circuit coupled to the high pass filter output terminal for producing at an output bus thereof a count of the number of occurrances that the signal passed by the high pass filter exceeds a predetermined amplitude; and
    a decoder circuit responsive to the count on the output bus for generating coefficient address signals for application to said coefficient producing means.

5. The television receiver set forth in claim 3 wherein the frequency analyzing means comprises:
    a signal differentiating means having an input terminal coupled to said second source and having an output terminal;
    a counting circuit coupled to the differentiating means output terminal for producing at an output bus thereof, a count of the number of occurrences that the signal processed by the differentiating means exceeds a predetermined amplitude; and
    a decoder circuit responsive to the count on said output bus for generating coefficient address signals in accordance with said count for application to said coefficient producing means.

6. Apparatus in the chrominance signal processing channel of a TV receiver for enhancing the signal-tonoise ratio of the chrominance component of the video signal comprising:

an adaptive low pass, linear phase, FIR filter for low pass filtering the chrominance signal, the cutoff frequency of said filter being alterable by the selective application of sets of programming coefficients thereto; and means responsive to the frequency spectrum of the current chrominance signal for producing coefficients for periodically reprogramming said filter in accordance with the current upper frequency range of the current chrominance signal thereby maintaining the filter bandwidth at a relative minimum to pass the chrominance signal.

7. The apparatus set forth in claim 6 wherein the means for producing coefficients comprises:

first and second filters at least the second one of which having an alterable bandwidth by means of coefficients applied thereto; said first and second filters coupled for receiving the chrominance signal;

means for subtracting the signal passed by the second filter from the signal passed by the first filter for producing a band passed signal;

means responsive to the band passed signal for counting the number N of occurrances said band passed signal exceeds a predetermined amplitude;

means responsive to address codes for producing sets of filter coefficients for application to said second filter and said adaptive filter; and decoding means responsive to the number N counted by the counting means for generating said address codes.

8. The apparatus set forth in claim 7 further including a delay element for coupling said chrominance signal to the adaptive filter.

9. The apparatus set forth in claim 7 wherein said second filter is subsummed in said first filter.

10. The apparatus set forth in claim 7 wherein the adaptive filter is subsummed in in said second filter.

11. The apparatus set forth in claim 7 wherein the counting means includes a high pass filter having an input coupled to the means for subtracting and having an output terminal;

a threshold detector coupled to the output of the high pass filter for generating a bilevel signal which changes state on the occurrence of signal coupled thereto passing through a predetermined value and a binary counter having an input terminal coupled for applying said bilevel signal thereto.

* * * * *